United States Patent [19]

Doyle

[11] 4,190,366
[45] Feb. 26, 1980

[54] REFRACTIVELY SCANNED INTERFEROMETER

[75] Inventor: Walter M. Doyle, Laguna Beach, Calif.

[73] Assignee: Laser Precision Corporation, Utica, N.Y.

[21] Appl. No.: 790,457

[22] Filed: Apr. 25, 1977

[51] Int. Cl.$^2$ ............................................. G01B 9/02
[52] U.S. Cl. ........................ 356/346; 250/237 G; 356/374
[58] Field of Search ............... 356/106 R, 106 S, 107, 356/113, 346; 250/237 G

[56] References Cited
U.S. PATENT DOCUMENTS

| 3,153,111 | 10/1964 | Barber et al. | 250/237 G |
| 3,661,464 | 5/1972 | Hubbard | 356/106 R |

OTHER PUBLICATIONS

Kassel, private communication to Applicant, copies supplied by Applicant.
Beaudouin et al., "Optical Path Length Compensator," IBM Technical Disclosure Bulletin, vol. 13, No. 7, 12/70.
Ring et al., "Field Compensated Michelson Spectrometers," Applied Optics, vol. 11, No. 3, pp. 507–516, Mar. 1972.
Mertz, L., Transformations in Optics, Wiley & Sons, N.Y., pp. 16–20.

Primary Examiner—Conrad J. Clark
Attorney, Agent, or Firm—Thomas J. Plante

[57] ABSTRACT

An interferometer, preferably of the Michelson type, is disclosed, in which the reflectors associated with the interferometer arms are stationary, and scanning is accomplished by displacement of a single wedge-shaped refractive element in one of the arms. The reflectors are preferably retro-reflectors rather than flat mirrors in order to minimize the effects of chromatic dispersion. A Moire scale may be used to measure the position of the wedge-shaped refractive element.

15 Claims, 7 Drawing Figures

A
MONOCHROMATIC RADIATION

B
BROAD BAND RADIATION

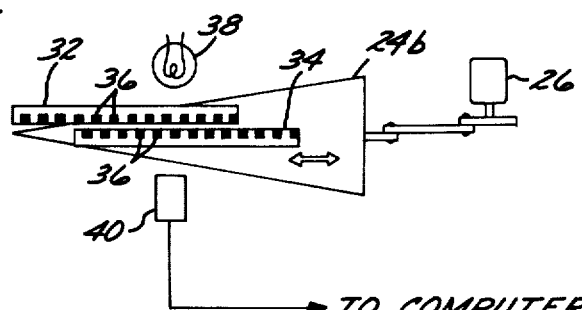
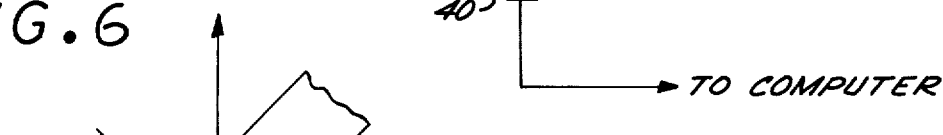
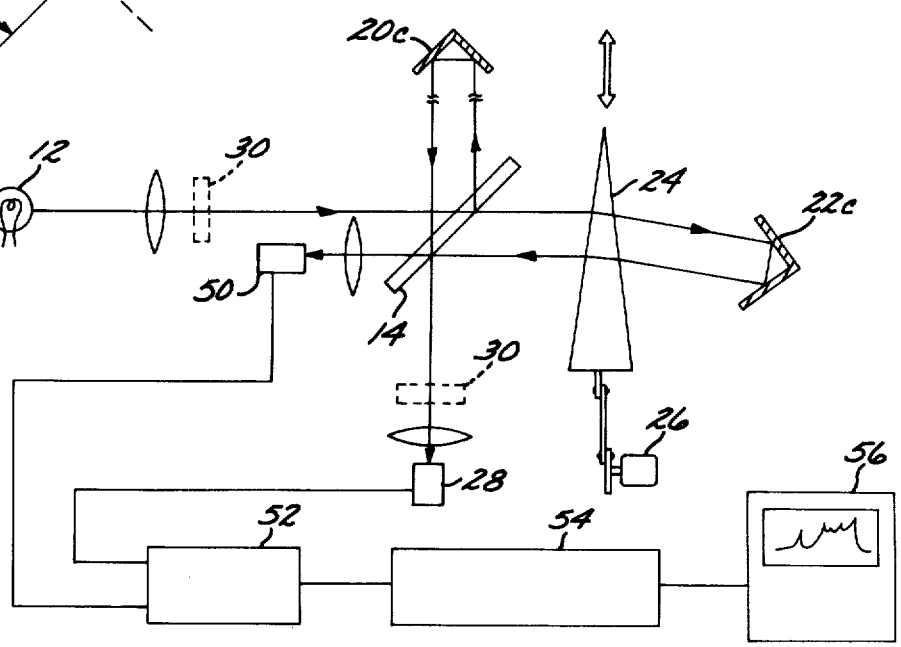
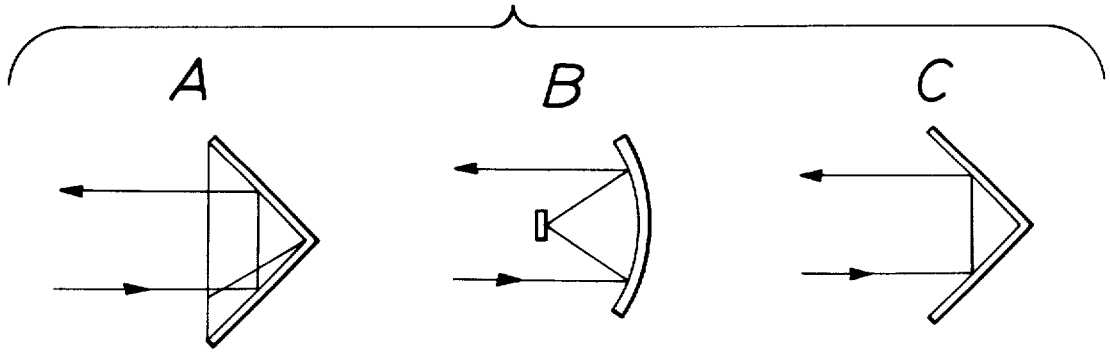

REFRACTIVELY SCANNED INTERFEROMETER

BACKGROUND OF THE INVENTION

This invention relates to the field of interferometry, and particularly to scanning interferometers intended for use in infrared spectrometry. More specifically, its primary focus is on a major improvement in Michelson interferometers intended for use in infrared Fourier transform spectroscopy. The present interferometry invention makes possible the use of the Fourier transform approach for a wide variety of practical tasks, including stack monitoring, medical gas analysis, liquid and gaseous process control, and the analysis of gas chromatography fractions.

The Michelson interferometer is discussed in detail in the book "Chemical Infrared Fourier Transform Spectroscopy" by Griffiths, published by John Wiley & Sons. The following is quoted from Pages 9 to 10, referring to a figure shown therein:

"The Michelson interferometer is a device that can split a beam of radiation into two paths and then recombine them so that the intensity variations of the exit beam can be measured by a detector as a function of path difference. The simplest form of the interferometer is shown in FIG. 1.1. It consists of two mutually perpendicular plane mirrors, one of which can move along the axis shown. The movable mirror is either moved at a constant velocity or is held at equidistant points for fixed short time periods and rapidly stepped between these points. Between the fixed mirror and the movable mirror is a beamsplitter, where a beam of radiation from an external source can be partially reflected to the fixed mirror (at point F) and partially transmitted to the movable mirror (at point M). After each beam has been reflected back to the beamsplitter, they are again partially reflected and partially transmitted. Thus, a portion of the beams which have traveled in the path of both the fixed and movable mirrors reach the detector, while portions of each beam also travel back toward the source."

If the two paths, or arms, of the interferometer have equal lengths, and the mirrors are properly oriented relative to the beamsplitter, the beams propagated toward the detector will combine constructively and a maximum signal will be obtained at the detector. The signal obtained with nonequal path lengths depends in a complex way on the spectral nature of the radiation. For example, monochromatic radiation, such as that obtained from a single wavelength laser, will give rise to a sine wave of amplitude versus position, wherein the displacement required to trace out one cycle is equal to one half of the radiation wavelength. Radiation which is not monochromatic but is still limited to a specific band of wavelengths will trace out a "damped" sine wave in which the central peak corresponds to equal path lengths.

The pattern traced out, as the length of one interferometer arm is scanned, is the Fourier transform of the wavelength spectrum. Thus, by using a computer to perform the required mathematical transformation the Michelson interferometer can form the basis of a sophisticated spectrometer. Such a "Fourier Spectrometer" has advantagesj over conventional spectrometers in such areas as speed and sensitivity.

Most of the Michelosn interferometers built to date have been scanned by an actual mechanical displacement of one of the mirrors. This method is extremely expensive and delicate, due to the need to control the mirror position to a fraction of one wavelength of the radiation under study (as short as 2 micrometers for most instruments).

Because of this scanning difficulty in prior art interferometers, their use in spectroscopy has been severely limited. This is a limitation which the present invention is designed to remove.

Reference to certain prior art is necessary, even though its purpose is not related to the problem of scanning movement in the interferometer, but instead to the problem created by the limited light-acceptance angle of the instrument. An article by Ring and Schofield, in the March, 1972, issue of Applied Optics (Page 507), shows a number of interferometer designs in which both a moving wedge of refractive material and a moving mirror are used to effect scanning. In all such cases, the purpose has been to increase the acceptance angle of the instrument (i.e., to broaden its field-of-view). Since the goal of these schemes inherently requires both a moving refractive element and a moving mirror, no savings in cost or adjustment criticality is obtained.

A simple example of a field broadened interferometer is referred to in the Ring and Schofield article as "Mertz's first system." This system uses a pair of wedges, positioned so as to approximate a rectangular parallelepiped. As one of the wedges is displaced in the direction indicated, the thickness of the parallelepiped changes. This gives rise to a change in the effective optical path length, by virtue of the fact that the optical path length in the parallelepiped is $d=nt$, where t is the thickness, and n is the index of refraction.

In the Mertz system, scanning is accomplished by simultaneously moving the wedge and the mirror in such a way as to provide the greatest possible angular field of view over the full scan distance. The proper relationship between the velocities of the movements is discussed in the article. The rectangular compensating element shown therein is not essential to system operation, but does provide improved performance by compensating for the average thickness of the wedge elements.

A similar concept is shown in an article by Despain, Brown, Steed and Baker in the Proceedings of the Aspen International Conference on Fourier Spectroscopy, 1970 (note Page 295), wherein a movable wedge and mirror are combined in one element by silvering the rear surface of a wedge-shaped prism.

As mentioned above, the attainment of the maximum field-broadening effect requires both a moving wedge and a moving mirror. However, a very substantial reduction in motion criticality, and hence cost, can be achieved if the mirror remains stationary and only the refractive element is moved. Specifically, the refractive element can be designed so that a large mechanical motion will result in a relatively small change in optical path length, thus reducing the need for critical position tolerances on the moving parts. One design based on this principle has previously been disclosed. (See Barringer U.S. Pat. No. 3,482,919). This design uses a flat refractive plate in one arm, the angular position of which is mechanically oscillated so as to vary the optical path length in the plate. One disadvantage of this approach resides in the fact that the oscillating motion gives rise to a substantial displacement of the optical beam. This places severe restraints on the design and alignment of the reflector in the scanned arm.

An improved cost-reduced interferometer is the "wedge plate" design described to me by Asron Kassel, a consultant, in January, 1976. This design is functionally identical to Mertz's first system, with the significant exception that both mirrors are stationary. It thus provides reduced motion criticality without introducing as much beam displacement during scanning as the oscillating plate design of Barringer. It has the disadvantage (common to the Mertz system) of requiring transmission through at least four refractive surfaces for each direction of light propagation in the scanned arm. If the transmission at each surface is T, the net transmission will be $T^8$. This can lead to a significant reduction in performance, since it is impossible to achieve a low reflection loss over the full optical band of usual interest. For example, if $T=0.7$, the net transmission will be $(0.7)^8 = 0.057$. On the other hand, if the number of refractive surfaces can be reduced from four to two, the transmission in this example will be increased to $(0.7)^4 = 0.24$.

Since there is a significant relationship between the present invention and the use of retro-reflectors (instead of flat mirrors), this background discussion should also acknowledge that retro-reflectors are not novel per se. Such devices are shown in Diehr U.S. Pat. No. 3,419,331 and in Hubbard U.S. Pat. No. 3,409,375. In both of these patents, however, it is necessary that a retro-reflector be moved in order to effect scanning. Because of their bulk, the movable retro-reflectors add to the difficulty of obtaining reliably-controlled scanning motion.

In order to complete the listing of publications in this field which have come to my attention as a result of novelty searches, the following are noted: Girard U.S. Pat. No. 3,684,379; Barr et al U.S. Pat. No. 3,217,591; Hubbard U.S. Pat. No. 3,409,375; Mertz U.S. Pat. No. 3,469,923; Girard U.S. Pat. No. 3,432,238; and Mertz U.S. Pat. No. 3,246,557.

SUMMARY OF THE INVENTION

It is the intent of my invention to provide a scanned interferometer, preferably of the Michelson type, which exhibits neither the mechanical motion criticality associated with the moving mirror designs, nor the large scale beam displacement which is characteristic of the oscillating plate design. A further intent is the minimization of the number of refractive surfaces through which the optical radiation must pass. The overall intent is the development of an interferometer which is rugged, sensitive, reliable, and inexpensive to fabricate.

Most simply stated, my invention is an interferometer wherein scanning is accomplished by means of a single, uncompensated refractive element, preferably wedge-shaped in cross-section, used in conjunction with stationary reflectors. However, it will be shown below that satisfactory performance will be achieved only if certain restraints are placed on reflector design.

BRIEF DESCRIPTION OF THE DRAWINGS:

FIG. 4 is a diagrammatic plan view of the wedge-shaped scanning prism combined with a Moire scale position sensor;

FIG. 5 is a diagrammatic plan view of an interferometer in which dual detectors are used to reduce the dynamic range required by the Fourier transform computation equipment;

FIG. 6 is a cross-section of the beamsplitter illustrating its optimal thickness in relation to the average thickness of the wedge-shaped scanning prism; and FIG. 7 illustrates three forms of retro-reflectors, each of which may be combined with the wedge-shaped scanning prism to provide optimal results.

DETAILED DESCRIPTION OF SPECIFIC EMBODIMENTS

Figure 1:
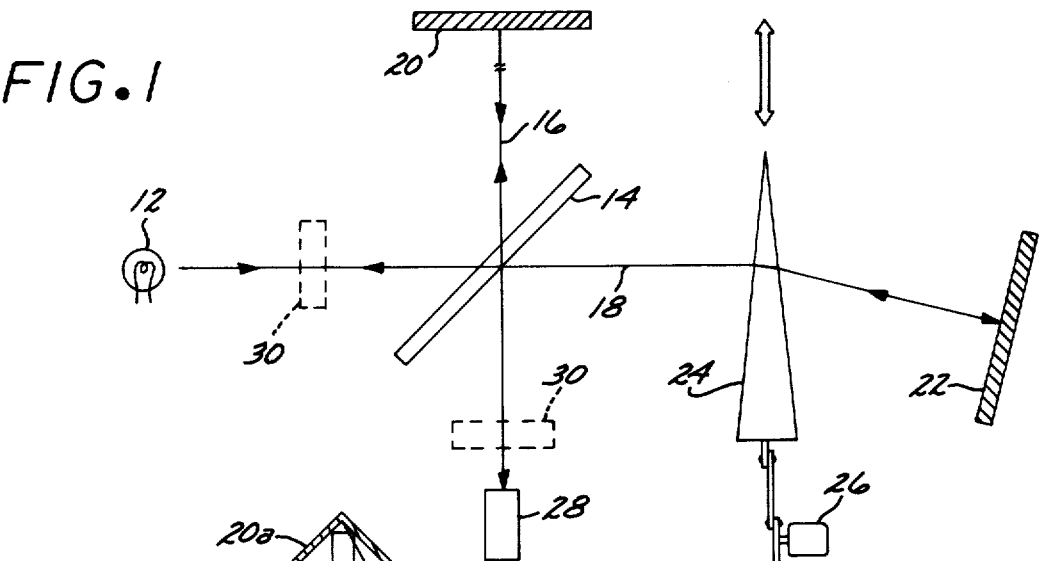
FIG. 1 is a diagrammatic plan view of an interferometer incorporating my invention, in which the stationary reflectors are flat mirrors.

In the interferometer of FIG. 1, a radiation source 12, preferably using infra-red light, propagates radiation toward a beamsplitter 14, which causes a reflected beam 16 to take one path and a transmitted beam 18 to take another path.

One respect in which my invention differs from most of the prior art is the use of a stationary mirror, or reflector, at the end of each path, or arm, of the interferometer. The beam 16 is shown being reflected back toward the beamsplitter by a stationary reflector 20, which in this version is a flat mirror. This reflector determines the path length of radiation in the arm of the interferometer which provides an unchanged path length.

The other beam 18 is also reflected back toward the beamsplitter by a stationary reflector 22, also shown as a flat mirror. However, the path length of the radiation in this arm of the interferometer is changed by a refractive device which is a primary feature of my invention.

A single wedge-shaped member 24 is interposed as a scanning prism in the path of beam 18 between beamsplitter 14 and mirror 22. This wedge-shaped member is movable across the path of the beam, in the direction shown by the arrow, for the purpose of varying the length of the path by changing the thickness of refractive material through which the radiation passes. A suitable driving means 26 is associated with wedge-shaped member 24 to move it back and forth across the path of the beam 18, thereby scanning the effective radiation path length.

The reflected beams 16 and 18 are recombined at the beamsplitter 14, and a portion of the recombined radiation is propagated toward a suitable detector 28, which responds to the radiation intensity. That intensity will vary as the refractive wedge is moved across the path of radiation in one interferometer arm, thereby changing the phase relationship between radiation in that arm and radiation in the other, unchanging-length interferometer arm.

Where the interferometer is used for spectrometry, a sample 30 of the material being analyzed may be placed either between the detector 28 and the beamsplitter or between the light source 12 and the beamsplitter.

The simple concept just described—combining a single uncompensated refractive wedge with stationary reflectors in both interferometer arms—provides major functional advantages over the prior art.

The difficulties associated with the problems of mechanical movement of a reflector, and the usage limitations created by such difficulties, have been recognized in this field. For example, the Griffiths book, supra, on Pages 36–40 discusses the effects of reflector position-control problems under the headings "Effect of Mirror Misalignment" and "Effect of a Poor Mirror Drive." In some cases, designers have gone to great lengths to provide sufficiently precise and reliable reflector-motion controls. Not only is precisely controlled motion inherently a difficult and costly problem because of the minute distances involved; but also moving the reflector greatly increases the likelihood of its misalignment.

My use of fixed reflectors combined with a single moving wedge greatly reduces the criticality of the mechanical movement. Not only is the wedge member easier to move than the reflector, but its transverse motion permits a highly favorable mechanical advantage. By using a narrow wedge angle, the ratio of mechanical motion to refractive path change is made relatively high, thereby permitting a very simple, but precise, control of the spectral scan.

The use of a moving wedge as a scanning device in effect results in a mechanical amplification of the optical path length change. For example, a total path length change of one millimeter can typically correspond to a wedge motion of 25 millimeters. In addition to the advantage of reduced motion criticality, this factor offers the possibility of using an inexpensive method for keeping track of scan position.

The use of a single moving wedge-shaped prism has not, to my knowledge, been proposed earlier, in spite of its simplicity and its outstanding advantages. Possibly, if such a structure was ever considered, it might have been discarded on the assumptions that a compensating wedge would be required in order to prevent lateral deflection, or translation, of the beam as the prism is moved, and that such a compensating wedge would significantly reduce performance due to reflection loss, as discussed above. The fact is that such a compensating wedge is not necessary; and the advantages of moving a wedge-shaped prism instead of a reflector can radically improve the use of Fourier transform spectroscopy.

There are, however, potential problems with the arrangement shown in FIG. 1, wherein the single wedge interferometer uses flat stationary reflectors. The deflection of a light beam at the wedge surfaces is governed by Snell's law: $n \sin\theta = n' \sin\theta'$, where $\theta$ and $\theta'$ are the angles of incidence and refraction at a given surface, and n and n' are indices of refraction on the two sides of the surface. For a narrow wedge angle, the total deflection by two surfaces is given approximately by the simplified expression $\delta = (n'-1)\alpha$, where n' is the index of refraction of the wedge, and $\alpha$ is the wedge angle.

In order for an interferometer to function, the beams in the two arms must be superimposed at the beamsplitter, so that they overlap, and so that their wavefronts are parallel to within a fraction of a wavelength across the overlap region. This requires precise alignment of the reflectors relative to the propagation directions in the two arms.

In the system of FIG. 1, it can be seen that the proper mirror alignment will depend on the wedge angle, $\alpha$, and the index of refraction, n'. This presents a problem with the system as illustrated, due to the fact that the index of refraction depends on wave-length. Thus, proper alignment will be achieved only for a narrow band of wavelengths.

Figure 2:
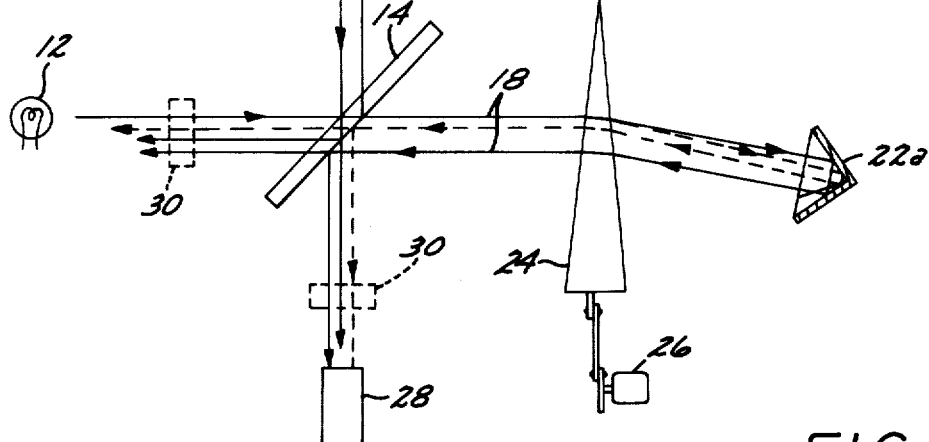
FIG. 2 is a diagrammatic plan view of the preferred version of the invention, in which the stationary reflectors are retro-reflectors.

The solution to the problem presented by the wavelength dependence (or dispersion) of the refractive index is to replace the flat mirrors with retro-reflectors, such as "cube corners" or "cat's eyes." This system is illustrated in FIG. 2, showing cube corners 20a and 22a in place of the flat reflectors 20 and 22 of FIG. 1.

Retro-reflectors have the property of returning an incident beam in a direction parallel to the direction of incidence, independent of that direction. Thus, even though light of different wavelengths will experience different deflections at the wedge, as illustrated by the solid and dashed lines, the retro-reflector will return each wavelength signal on a path which will result in proper wavefront superposition. There will be some variation in the transverse beam displacement with wavelength, but the effect of this will be much less severe than that due to wavefront tilt.

It was noted above that retro-reflectors have been used in previous interferometer designs. However, in the case of the single wedge interferometer, their use is dictated by the dispersive effects discussed above. Furthermore, since my design does not require a moving reflector, the use of the relatively bulky retro-reflectors is much more practical than would be the case in a conventional interferometer. Thus, the use of retroreflectors solves a problem in the single wedge interferometer; and the single wedge concept solves a problem caused by the use of retro-reflectors because it removes the necessity for moving one of them for scanning purposes.

In addition to minimizing dispersive effects, the use of retroreflectors offers the advantage of greatly reduced alignment criticality. This is very important to my overall goal of reduced cost. Another advantage results from the fact that retro-reflectors allow the interfering beams to be displaced from the incident beam at the beamsplitter. This allows the combined beam propagating toward the source to be detected without obscuring the source.

Figure 3:
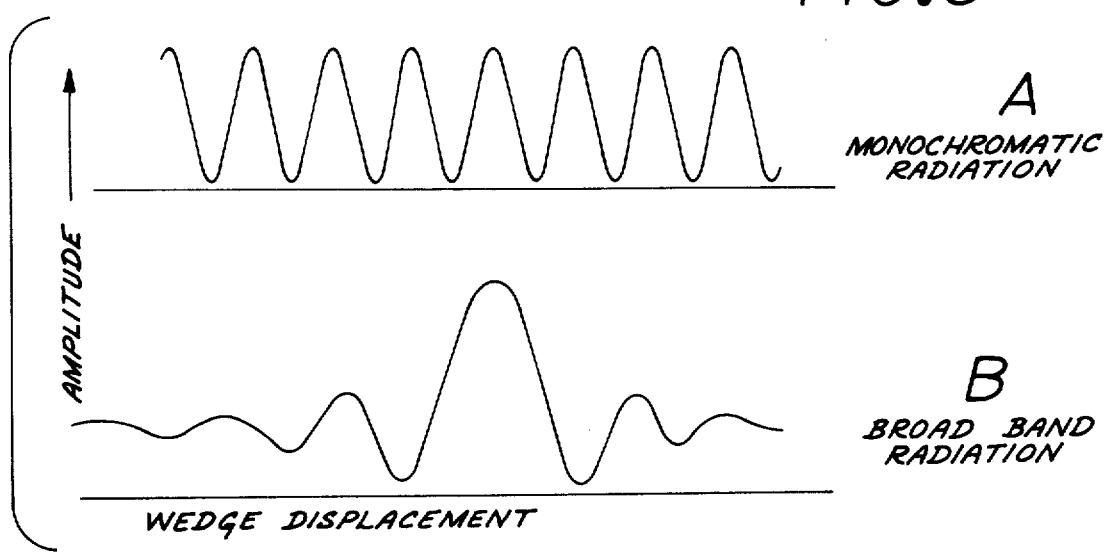
FIG. 3 is an illustration of possible spectral plots of monochromatic radiation and broad band radiation, respectively, in which the radiation intensity is plotted against the position of the refractive device.

FIG. 3 shows typical spectral analysis plottings of radiation intensity vs. wedge position. These patterns are traced out as scanning is accomplished by changing the optical path length in one arm and then recombining the beams in the two arms. Line (A) in the figure shows the sine wave interferogram obtained with monochromatic radiation, such as that obtained from a single wavelength laser. Radiation which is not monochromatic, but is still limited to a specific band of wavelengths, will trace out a "damped" sine wave, such as that shown in line (B) of the figure.

As stated above, the pattern traced out, as the length of one interferometer arm is scanned, is the Fourier transform of the wavelength spectrum. By using a computer to perform the required mathematical transformation, the interferometer can form the basis of a sophisticated spectrometer, having advantages over conventional spectrometers in such aspects as speed and sensitivity.

Such an improved Fourier transform spectrometer, which becomes possible with this invention, is the first instrument to bridge the gap between the present, relatively inexpensive, but low performance on-line analyzers and the sophisticated, powerful, and very expensive laboratory Fourier Spectrometers. Although the resultant spectral resolution does not match that of the highest performance Fourier instruments, it is an order-of-magnitude better than that achievable with conventional process analyzers, and more than adequate for most applications. Combining this efficient optical design with modern low-cost mircoprocessor technology makes possible the use of the Fourier approach for a wide variety of practical tasks, including stack monitoring, medical gas analysis, liquid and gaseous process control, and the analysis of Gas Chromatography fractions.

Compared to other on-line instruments, such as nondispersive filter analyzers, circular variable filter spectrometers, and Luft analyzers, such an improved spectrometer offers a number of advantages, typically including: (1) multiple component identification and analysis, (2) greatly increased specificity and sensitivity, (3) field programmability, (4) wide spectral range, (5) rapid response, and (6) versatility.

FIG. 4 illustrates an important advantage of the wedge-like refractive prism. Because of its magnified motion, as compared to the change in radiation path length, a simple displacement monitoring device, called a Moire scale, can be used to accurately measure displacement of the wedge, thereby keeping track of scan position.

A pair of glass plates 32 and 34 is used to indicate the position of refractive wedge 24b. Each glass plate has a microscopic pattern of lines 36 (Ronchi rulings, which are shown highly magnified). One plate, 32, is stationary and the other plate, 34, is fastened to the moving wedge. A source 38 propagates light toward the plates, and a detector 40 is used to monitor the transmission of light through the plates. A relative movement equal to the separation between a dark and a light line will cause the overall transmission to change from dark to light. As the wedge moves, the light transmission will vary periodically, giving rise to an electronic counting signal in the detector output.

This type of displacement monitoring apparatus is commonly used with machine tools. The mechanical amplification feature of wedge scanning makes it applicable to interferometry as well.

FIG. 5 shows an overall spectrometer diagram, which incorporates a dual detector interferometer system. Such an arrangement, which has functional advantages over a single detector system, is made possible by the substitution of retro-reflectors for flat reflectors, a substitution which, as previously explained, is made much more practical by the fact that both reflectors are stationary. In the figure, the light source 12 is shown propagating radiation toward beamsplitter 14, which directs radiation toward retro-reflectors 20c and 22c. Wedge 24 provides the same scanning function as that already described. In addition to detector 28, which receives the recombined beams from the beamsplitter, a separate detector 50 receives radiation which, in a flat mirror interferometer, would propagate back toward the source 12 (see FIG. 1). If both beams are detected, and the resultant electrical signals are properly scaled and subtracted, the net signal can be nulled (ie: a zero output will be obtained for equal detector path lengths and no sample). If a sample of a material under study is then placed between the beamsplitter and one of the detectors, the signal obtained will depend only on the properties of the sample. This "dual detector" approach greatly reduces the dynamic range required by the Fourier transform computation equipment. This system is possible because the path of the radiation beam returning toward the light source is parallel to, but not coincident with, the path of the initial beam from the source.

FIG. 5 also shows diagrammatically components of an electronic system used in a Fourier transform spectrometer, which would include a summing amplifier 52, a computer 54, and a spectral display 56.

FIG. 6 is used to explain the optimal dimensional relationship between the thickness of the beamsplitter and the thickness of the refractive wedge 24. In designing the beamsplitter, it is desirable to select its material and thickness so as to yield an optical path length within the beamsplitter equal to the average path length in the translating wedge. This will maximize the angular field-of-view for equal path lengths in the two arms, ie: in the vicinity of the central maximum of the interferogram. This eliminates the need for any additional compensating elements, such as that shown in the Mertz concept referred to above.

By using Snell's law, and requiring that the average wedge thickness, $t_w$, be equal to the path length, $l$, within the beamsplitter, it can be shown that the optimum beamsplitter thickness is given by $$t = t_w[l - (\sin^2 \theta)/n^2]^{\frac{1}{2}}$$

where n is the refractive index of the beamsplitter. For the case illustrated in FIG. 6, $\theta = 45°$, so that sin $\theta = 0.707$. If furthermore, n = 4.01 (germanium) we have t = 0.984 $t_w$. When this condition is met, the maximum field-of-view will be obtained at the equal path length position, and the wedge can be said to compensate for the thickness of the beamsplitter.

FIG. 7 shows three different types of retro-reflectors, any one of which can be used with my single wedge refractive element. 7(A) shows a "cube corner" retro-reflector, consisting of three reflective surfaces positioned so as to make 90° angles with each other. 7(B) shows a "cats-eye" retro-reflector, wherein an optical element (lens or curved reflector) focuses radiation on the surface of a mirror. 7(C) shows a "roof top" retro-reflector, consisting of two reflective surfaces making a 90° angle.

The following claims are intended not only to cover the specific embodiment disclosed, but also to cover the inventive concepts explained herein, both singly and collectively, with the maximum breadth and comprehensiveness permitted by the prior art.

The following meanings are intended for certain words used in the claims. The word "uncompensated" refers to the fact that no oppositely angled wedge is needed to bend the light back to its original direction. The word "wedge" is to be contrued broadly to cover any refractive element which changes the length of the light path as the "wedge" is moved across the light path.

What I claim is:

1. A scanning spectral analysis interferometer, of the type wherein an interference pattern is generated by comparing light components traveling along, respectively, a first fixed-length path and a second variable-length path, comprising:

a first stationary reflector determining the length of the first path;

a second stationary reflector at the end of the second path;

a single wedge-shaped prism intersecting the second path; and means for moving the prism across the second path to cause path length scanning.

2. The scanning interferometer of claim 1 wherein the second stationary reflector is a retro-reflector, thereby causing the radiation beams toward and away from such reflector to follow parallel paths.

3. The scanning interferometer of claim 1 which includes means for measuring the scanning position of the wedge-shaped prism comprising:
   a pair of plates having parallel markings thereon, one plate fixed and the other moving with the prism; and
   light propagating and detecting means which causes light passing through the plates to measure the relative motion of the markings on the fixed and moving plates.

4. An interferometer for use in spectral analysis comprising:
   a beamsplitter for directing radiation from a source in optical paths along two diverging arms of the interferometer:
   a first stationary reflector at the end of one interferometer arm;
   a second stationary reflector at the end of the other interferometer arm;
   a single refractive element which intersects one of the interferometer arms and which is movable to vary the optical path length in that arm; and
   means for causing translational motion of said refractive element across the optical path.

5. An interferometer according to claim 4 which includes:
   a first measuring means for measuring the radiation intensities reflected from the interferometer arms;
   a second measuring means for measuring the positions of the refractive element during its translatory movement; and
   means for combining the measurements from said first and seconding measuring means to provide an interferogram.

6. The interferometer of claim 4 wherein the stationary reflectors are retro-reflectors.

7. The interferometer of claim 5 wherein the stationary reflectors are retro-reflectors.

8. The interferometer of claim 4 which includes means for measuring the scanning position of the refractive element comprising:
   a pair of plates having parallel markings thereon, one plate fixed and the other moving with the refractive element; and
   light propagating and detecting means which causes light passing through the plates to measure the relative motion of the markings on the fixed and moving plates.

9. A Michelson fourier transform interference spectrometer comprising,
   two stationary reflectors; and
   scanning means comprising an uncompensated moving wedge of refractive material which varies the light path length to and from one of the stationary reflectors.

10. The interferometer of claim 9 wherein the stationary reflectors are retro-reflectors, thereby substantially reducing the effects of chromatic dispersion in the uncompensated wedge.

11. The interferometer of claim 9 which includes a beamsplitter having an optical path which is approximately equal in length to the average optical path length in the wedge.

12. The interferometer of claim 9 wherein displacement of the scanning wedge is measured by means of a Moire scale.

13. The interferometer of claim 9 which includes:
   a first detector which responds to interferometer light which has passed through a sample;
   a second detector which responds to interferometer light which has not passed through the sample; and
   means for comparing the outputs of the first and second detectors.

14. The interferometer of claim 10 wherein displacement of the scanning wedge is measured by means of a Moire scale.

15. The interferometer of claim 11 wherein displacement of the scanning wedge is measured by means of a Moire scale.

* * * * *